United States Patent [19]

Schwab et al.

[11] Patent Number: 4,541,986

[45] Date of Patent: Sep. 17, 1985

[54] PROCESS FOR DEODORIZING SLUDGE

[75] Inventors: Heinrich Schwab, Frankfurt; Werner Kaschke, Aschuffenberg, both of Fed. Rep. of Germany

[73] Assignee: Degussa Aktiengesellschaft, Frankfurt, Fed. Rep. of Germany

[21] Appl. No.: 589,851

[22] Filed: Mar. 16, 1984

Related U.S. Application Data

[63] Continuation of Ser. No. 119,973, Feb. 8, 1980, abandoned.

[30] Foreign Application Priority Data

Dec. 23, 1977 [DE] Fed. Rep. of Germany ....... 2757561

[51] Int. Cl.$^4$ .......................... C02F 11/00; F01C 1/30
[52] U.S. Cl. ....................................... 422/5; 210/754; 210/764; 210/916
[58] Field of Search ............... 210/764, 916, 754, 756, 210/758; 422/5

[56] References Cited

U.S. PATENT DOCUMENTS 3,361,528  1/1968  Shen ................................. 210/63 R
3,705,098  12/1972  Shepherd et al. ................ 210/63 R
3,867,509  2/1975  Geiger et al. ..................... 210/63 R
4,108,771  8/1978  Weiss ................................ 210/62 X
4,157,300  6/1979  Junkermann et al. ............ 210/62 X

FOREIGN PATENT DOCUMENTS 51-47585  4/1977  Japan ..................................... 422/5

Primary Examiner—Thomas Wyse
Attorney, Agent, or Firm—Cushman, Darby & Cushman

[57] ABSTRACT

Sludge, especially sewage sludge is deodorized, particularly to obtain the biomass by treating the waste water sludge (pollution sludge) with an active oxygen developing compound at 5° to 40°C.

20 Claims, No Drawings

PROCESS FOR DEODORIZING SLUDGE

This is a continuation of application Ser. No. 119,973, filed Feb. 8, 1980, abandoned.

BACKGROUND OF THE INVENTION

In the purification of industrial and communal waster waters in mechanical-biological sewage treatment plants there also accrue besides the purified waste waters, which can be carried off without problems in the main canal or ditch relatively large amounts of sludge which likewise must be duly eliminated.

The sludge (fresh sludge) generally is deposited together from the primary sludge of the mechanical step of a sewage treatment plant (prelimnary sewage treatment) and the so-called surplus sludge which is derived from the biological step. Insofar as the waste water to be treated is additionally purified by way of a chemical precipitation, the so-called third purification step, there still accumulates a sludge with a predominantly inorganic character.

The sludge generally has a low dry material content and contains large amounts of microorganisms even of the pathogenic type, in the form of bacteria, viruses and grubs of intestinal parasites., A further criterion of sludges generally is a complete oxygen deficit.

Through anaerobic bacteria activity, i.e., through bacteria activity in the absence of dissolved oxygen and without introduction of air, there occurs, especially with sludges (sewage sludges), very quickly the formation of extremely bad and partially toxic odors which create a great problem in the treatment and removal of the sludge both for the operational personnel of a sewage treatment plant and also for the neighborhood.

The process of anaerobic, biochemical bacterial activity is designated as "acid fermentation" and is a process which is extremely undesired in waste water technique and particularly in the treatment of sludge. In this process oxygen necessary for the bacterial respiration is split off from oxygen containing compounds, in a given case even from the water molecules, whereby gases such as carbon dioxide ($CO_2$), hydrogen ($H_2$), hydrogen sulfide ($H_2S$), and small amounts of methane ($CH_4$) are formed. Furthermore there are formed through the bacterial activity otherwise unpleasant and ill-smelling sulfur and nitrogen containing odoriferous materials as e.g., mercaptans, thioethers or even ammonia. The splitting of fats contained in the waste water sludge by bacteria leads to the formation of organic acids such as acetic acid and butyric acid whereby the pH of the originally neutral sludge after a very short time is converted into the weakly acid range.

In the treatment and elimination of sludge, be it through disposal in agriculture, thickening by means of a thickner, dewatering by centrifuges or by thermal (drying, burning) or chemical treatment, it is anti-social to move, stir up or transport the sludge with the help of pumps or other aggregates.

Precisely in these necessary type of sludge treatment there are strongly emitted the previously mentioned ill-smelling and partially toxic odoriferous materials through which there occurs a large annoyance and danger to the health for the operating personnel and neighborhood of the sewage treatment plant.

However, while on the one hand uncontrolled, anerobic sludge decay in the form of the acid fermentation in the sludge collection hoppers of the preliminary sewage treatment and the thickening containers (preliminary thickners) is extremely undesired, on the other hand on the contrary there is consciously used the controlled, microbial decomposition of the organic contents of the sewage sludge in the so-called alkaline sludge decay, indeed it is required by an optimal pH and temperature control.

In this process the organic material is converted to methane (methane decay) with the help of specific groups of bacteria.

Since the sludge elimination in e.g., communal sewage treatment plants in nearly all cases previously were developed by way of the process of methane decay it was important therefore in many cases not to kill the microorganisms in the sludge, the sludge thus was not sterilized but only to check their vital processes to as great an extent as possible in the region of the sewage treatment plant in which the sludge is worked up, particularly in open systems.

However, should it not be decayed as, e.g. in storage in deposits, in transportation or in application to agriculture land, even then a nearly complete killing of all bacteria can take place since a deodorization is desired only for a specific time, namely for the time of further treatment.

Thus, e.g., for recovery of a sludge suitable for the treatment of fields there was described a combined treatment of this sludge through heat and agents splitting off chlorine, for total killing of the bacteria, see Johansson German OS No. 2460286.

This kind of sludge, however, can no longer be decomposed. Therefore it was essential for the art that there be a process in which a completely adequate deodorization occurs but not simultaneously restricting a complete killing of the bacteria.

SUMMARY OF THE INVENTION

It has now been found that this object can be attained if sludges, especially sewage sludges of communal sewage treatment plants, which because of easily decomposable, organic materials under anaerobic conditions produce strongly ill-smelling and partly toxic emissions can be deodorized practically quantitatively, particularly with the obtaining of biomasses if the waste water sludge is treated at 5–40° C. with compounds developing active oxygen.

Preferred treatment temperatures are 5–25° C.

As active oxygen developing compounds there can be used for example hydrogen peroxide as well as alkali perborates, e.g., sodium perborate or potassium perborate additionally alkali persulfates e.g., potassium persulfate and above all sodium or ammonium persulfate, organic per compounds, such as percarboxylic acids, e.g. perpropionic acid, perbutyric acid, perbenzoic acid, per-chlorobenzoic acid, perphthalic acid, perazelaic acid and above all peracetic acid and additionally percarbamide and also alkali metal and alkaline earth metal chlorites, e.g., sodium chlorite, potassium chlorite and calcium chlorite.

The active oxygen giving up compounds are preferably added at a pH of the sludge from 5.0 to 6.8 or even up to 7.0.

pH values above 7 of course are also possible for a treatment, but then the deodorization proceeds substantially slower, whereby generally larger amounts of oxidizing agents also must be added.

The deodorization is also possible at pH values below 5.0. In principle with mineral acids any other acid pH can be established. However, then at the lower pH value there must be reckoned with the danger of corrosion of the apparatuses and aggregates.

For the, if necessary, establishment of a pH favorable for the sludge treatment and deodorization there are suited all mineral acids so far as they are not able to be consumed by the agents of the invention. Thus there can be used hydrochloric acid and sulfuric acid, as well as the possible use of phosphoric acid or nitric acid.

Preferably there can be used hydrochloric acid or also sulfuric acid as aqueous solutions with pumping or stirring.

As the simplest procedure they are used in commercial, easily available concentrations, i.e., preferably of 15-36 weight % with hydrochloric acid or 15-96 weight % with sulfuric acid.

The preferred active oxygen liberating compounds are alkali or alkaline earth chlorites such as sodium, potassium or calcium chlorites. Especially preferred is sodium chlorite, namely in the form of its aqueous, commercial solutions. However, there can also be used dry, 80 weight % sodium chlorite and solutions of any desired concentrations produced therefrom.

Chlorites, in contrast to chlorine or hypochlorites as is known act not to chlorinate but by way of oxygen in the nascent state oxidizingly and retarding on the activity of the bacteria.

A great advantage of the process of the invention is that by the addition of the agent used in the invention in contrast to active chlorine containing agents, as for example, chlorine or hypochlorite, there is avoided the formation of strongly intense odor, toxic, chlorinated organic compounds as, e.g., in the presence of phenols (chlorophenol formations), amines or the like.

Besides there is a further advantage that in contrast to compounds splitting off chlorine there cannot be formed in the presence of ammonia or ammonia forming compounds the explodable nitrogen trichloride.

By the addition of alkali or alkaline earth chlorites or the other mentioned compounds of the invention ill-smelling odors already formed in the sludge are eliminated by chemical oxidation.

Thereby the process of the deodorization progresses quickly and quantitatively, long reaction times as, e.g., one or more hours, or higher reaction temperatures as a result thereof become practically unnecessary.

The process is much preferred as stated previously, carried out at 5-25° C.

The amount of chlorite or other compounds with active oxygen employed depends on the type and amount of sludge to be treated.

Sewage sludge which is drawn off relatively fresh and is worked up does not require so high an addition of oxidation chemicals and is easier to deodorize than already relatively old and therewith strongly decomposed sludge.

In practical experiments for guide values of the amounts of additives there has been found sufficient 50 to 70 kg of the 24 weight % sodium chloride solution per 100 m³ of sewage sludge. By using the amounts of chlorite solutions ascertained by the invention there can be stopped the biological decomposition of the sludge for the time of the sludge treatment and sludge elimination by one or more additions of the oxidizing agent.

The respective amounts to be employed with the other compounds giving up active oxygen are readily determined by a small scale experiment.

The killing of the microorganisms is possible but requires higher amounts.

Besides the use of active oxygen liberating compounds in all customary, communal, sewage treatment plants there can also be effectively deodorized industrial wastes, e.g., from paper factories, textile and chemical fiber plants, sugar factories, breweries and dairies, animal body removal plants or tankage factories with chemicals providing active oxygen.

The process can be carried out continuously or discontinuously in the customary sludge pile containing and sludge thickeners or others which correspond to the manner of the respective preparation of a sewage treatment plant. Also any other reactor which guarantees a sufficient thorough mixing, either through movable or fixed installations, by using compressed air or by circulating by means of slurry pumps can be employed.

The industrial and technical process advantage of the process of the invention with active oxygen yielding compounds, preferably chlorites, is first in the simple and problem free use and carrying out of the process, namely particularly through the direct addition of the active oxygen yielding compounds as well as under the demand of apparatus present at the spot for sludge treatment and elimination (heat exchanger as, e.g. in the process of German OS No. 2460286 are superfluous).

This means for the practice that apparatus for production and recovery of the oxidation chemicals before the spot generally are not required, since especially with the recommended use of sodium chlorite solutions, easy to handle, stable, commercial solutions are added, which in contrast perhaps to chlorine gas or hypochlorite are not subject to any fumigation or decomposition in the form of toxic gases, yet avoid extraordinary safety precautions.

The further prominent advantage of the present process is that for the use of active oxygen yielding chemicals, preferably with addition of sodium chlorite solutions, there is not needed reconstruction or other buidling procedures in the area of the sewage treatment plant but the treatment can take place in the sludge collection containers, e.g., the customary sludge thickeners, etc.

The mixing in of the active oxygen yielding compound as a solution take place in very simple ways either directly in the filling of the sludge collection container by hand or by a simple metering pump. For this purpose there suffices a thorough mixing of the sludge by means of a circulation pump or compressed air, or there takes place the feeding in of the chemical in the feeding line to the thickener with the help of a metering pump, or in a given case in the suction line of the sludge transportation pumps. Thereby an additional thorough mixing is eliminated. In the ideal case there can take place a control proportional to the quantity of the amount of sludge and active oxygen compound which results in an extremely economical procedures.

In contrast to known high energy consuming processes for sludge hygienization in which the resulting sludge is in part heated to high temperatures, see, e.g., German OS No. 2460286 the process of the invention is operated in the temperature range in which the sludge to be treated is formed, namely as a rule between 5 and 25° C. Higher temperatures than 25° C. are possible for a treatment, of course for the reason of economy of energy generally higher temperatures are not used.

A further advantage of the present process is that the sludge density (% TS, i.e. total solids) does not play a role for a treatment with active oxygen developing compounds, preferably chlorite solutions, so far as the sewage and industrial sludges can be sufficiently stirred up or mixed with customary sludge pumps, compressed air or other customary stirring devices or apparatus. Customary sludges fall in the region of about 3% TS, while industrial sludges frequently fall in the region between 2 and 12% TS so that a direct treatment is possible without special apparatus and without additional energy expense.

Higher sludge densities than 12% TS likewise can be deodorized very well, whereby on occasion special mixers or thick material pumps are employed.

The treatment time for the elimination of injurious and decay gases is, among others, dependent upon the type of sludge, the age of the sludge as well as the aim of the treatment.

An elimination of odor with temporary delay of the fermentation process occurs already after 5-20 minutes for the guide values mentioned for the amount of additives.

With the stated guide values for the amounts of additive and time of action there is reached a duration of deodorization which is sufficient for normal further treatment of the deodorized sludge.

If the guide values for the amount of additive are increased then the service life of the deodorized sludge is correspondingly increased.

Should it be necessary for reasons of sewage technology as, e.g., emptying of the pumps, general dropping of energy, to store the deodorized sludge longer than is customary, then without damage to the sludge there can be added periodically further amounts of the additives of the invention.

For this type of treatment the local situation and the aim plays a decisive role.

The fact is furthermore important for the practice that by addition of the preferred sodium chlorite solution while holding the guide values for the amount of additive there occurs practically no pH change in the sludge.

With the addition of active oxygen yielding compounds for elimination and tying up of odors, as was mentioned initally, e.g., in processes of preparation of sewage and industrial sludges in a prominent manner the requirement toward computation of environmentally safe chemicals is met.

In the elimination of odor or checking of odor with, e.g., alkali metal chlorites, there remain in the sludge as residue only small amounts of e.g., salt—amounts in the mg region—since, e.g., sodium chlorite is reacted to harmless sodium chloride.

The largest number of active oxygen containing compounds, above all the alkali of alkaline earth chlorites, are ready for use and directly usable and contain in solution neither health endangering injurious gases nor are any injurious gases set free by their use.

With active oxygen yielding materials, preferably alkali or alkaline earth chlorites the odor carried in the sludge is broken down chemically-oxidatively, i.e. is changed into a neutral odor harmless material. Since the odor is already oxidized in the sludge this has as a consequence that scarcely any odor forming material can be ascertained. Simultaneously the bacterial fermentation process is retarded by the corresponding additives for the desired time. The chemical oxidation of odors with simultaneous checking of the bacterial decomposition of the sludge is a great advantage compared to other additives which for example can only as an overcoat act as a masking for a short period of time.

Anaerobic fermentation processes in the sludge as the main producers of ill-smelling and toxic odors cannot be stopped by this type of odor masking chemicals, see, e.g. German OS No. 2531496.

It is of greater significance for the practice that the addition of active oxygen yielding compounds preferably sodium chlorite exert no disadvantageous effects, e.g. on the operations in the so-called alkaline sludge decay (methane decay).

With these, in the process still mostly used in the sewage treatment plants, the organic dirtying materials of the sludge (undissolved fats, carbohydrates, proteins) are further broken down by bacterial action. Usage tests in sewage treatment plants have shown that with the guide values for sodium chlorite solutions besides the desired action of odor elimination and odor retardation during the period of sludge transport, however, again the full bacterial activity is attained, which is necessary for the microbial breakdown.

It is not normally necessary to produce the active oxygen yielding compound before the place of use since in the process of the invention there are employed commercial, easy to handle transport containers for the corresponding chemicals. By setting up a storage plant for the deodorization agent, especially when adding sodium chlorite solution or even hydrogen peroxide solutions there can be produced very favorable sludge treatment costs, since among others there can take place via the built in metering pump concret, quantitative additions based on the sludge to be treated.

The industrial advantage of the process of the invention first is in the possibility of completely deodorizing sludges for their further working up, but, if necessary, to maintain sufficiently active for a methane decay.

It goes without saying that this type of treated sludge can also be deposited after the customary chloride of lime addition.

There can also be considered other known ways of treatment, as burning or composting after the deodorization of the invention.

As a practical matter sufficient deodorization occurs after a single addition of the agent splitting off active oxygen.

The following examples further explain the process of the invention.

The evaluation of the treated and untreated sludges took place chiefly by way of sensoring odor tests which were undertaken by several test people. The odor testing took place within several days. Furthermore, qualitative excess measurements were carried out, in the case of sodium chlorite solution, on the treated samples.

The laboratory scale, semi-industrial and industrial tests in each case were carried out in communal sewage treatment plants, i.e., under the conditions in practice. Unless otherwise indicated all parts and percentages are by weight.

The process can comprise, consist essentially of or consist of the steps set forth and the materials can comprise, consist essentially of or consist of those set forth.

DESCRIPTION OF THE PREFERRED EMBODIMENTS

Example I

Fresh sludge from a communal sewage treatment plant was treated in neutral odor 10 liter plastic pails with increasing amount of sodium chlorite wherein there were used amounts of additive of 30, 50, 70, 100 and 120 kg of an about 24 weight % sodium chlorite solution per 100 cubic meters of sludge. There was only a single addition of deodorizing agent in each case. The parameters of the starting sludge were pH 6.1, content of dry material 6.5%, ignition residue 18.4%, loss on ignition 81.6%, temperature 12° C.

After good thorough mixing the plastic pails including an untreated sludge sample as a comparison were closed with alumina foil and stored free at outer temperature between 8 and 12° C. in a low wind place.

After standing in each case for 0.5, 1, 2 and 3 days the pails were opened, stirred and sensory tests made by several test personnel. Likewise at this time there took place quatitative tests on residual sodium chlorite as well as pH measurements.

(a) At the lowest amount of additive of 30 kg of sodium chlorite solution per 100 m$^3$ of sludge the deodorization was not completely satisfactory. The specific sludge odor compared to the untreated comparison sample could only be stopped partially and also only temporarily. After about 8 hours no residual chlorite was detectable.

(b) With an amount of additive of 50 kg/100 m$^3$ sludge on the contrary there could be produced a good deodorization, namely within about 15 minutes. The effect of the good stopping of odor persisted over a time of about 2 days. Only after this period of standing did there occur specific odors; the sodium chlorite was consumed within 48 hours.

(c) With an amount of additive of 70 kg/100 m$^3$ sludge a very good deodorization was produced. The stopping of the odor was unobjectionable and reached about 5 minutes after mixing in the sodium chlorite solution. The good sensory impression was maintained over the entire test time of the standing test of 3 days. This time was established as the goal for the test series. Residual sodium chlorite was still detectable after 2 days but was completely broken down within 3 days.

(d) No significant improvement in odor was produced compared to 70 kg/100 m$^3$ of sludge corresponding to the amounts of sodium chlorite added by using the higher amounts of sodium chlorite, namely 100 or 120 kg/100 m$^3$ of sludge. The reaction to chlorite after the end of the test, namely 3 days, was still positive.

The pH value in all of the tests described, points (a) to (d) was practically unchanged through the addition of the sodium chlorite solution.

Example 2

Two day old communal sludge which was stored over this time period and therewith already was strongly putrescent was treated with sodium chlorite, wherein there were added 50, 70 and 100 kg of the about 24 weight % sodium chlorite solution per 100 m$^3$ of sludge. The addition of the deodorizing agent was carried out only once, at the beginning of the treatment.

The properties of the sludge were as follows: pH 5.9, content of dry material 3.6%, ignition residue 35.4%, ignition loss 64.6%, the temperature of the sludge was 8° C.

After good thorough mixing standing tests were carried out with the sludge samples in neutral odor plastic pails in the free over a time of 3 days. Description and type of odor testing were as given in Example 1. The temperature during the testing period was 8° C.

(a) With an amount of addition of 50 kg of sodium chlorite solution per 100 m$^3$ of sludge there could be attained good deodorization over a time of 2 days. Only after the period of time did there first occur again, slight emission of odor.

(b) With 70 kg of sodium chlorite per 100 m$^3$ of sludge a very good stopping of the odor and bacterial retarding of the fermentation process, which sufficed over the entire fixed test time of 3 days. Residual chlorite was still detectable after 2 days, however, it was no longer detectable after 3 days standing.

(c) An improvement of the deodorizing effect with 100 kg of sodium chlorite solution per 100 m$^3$ of sludge compared to the concentration mentioned under (b) was barely detectable. To be sure there could still be detected after the fixed standing time of 3 days sufficient residual chlorite. From this it is concluded that with this amount of additive there are possible longer standing times than 3 days with good retardation of odor and at the stated temperature.

No changes in pH occurred in the mentioned tests.

Example 3

Fresh communal sludge was called upon for deodorization tests with sodium chlorite. As the goal for the elimination of odor and retarding of odor there was again established 3 days at amounts of additive of about 24 weight % of aqueous sodium chlorite solution of 50, 70, 100 and 120 kg/100 m$^3$ of sludge. The temperatures during the standing test fluctuated between 18 and 21° C. The test description and sensory testing were as explained in Example 1.

The parameters of the sludge were: pH 5.8, content of dry material 3.2%, ignition residue 27.6%, ignition loss 72.4%, temperature 20° C.

(a) Amount of addition of 50 kg sodium chlorite solution/100 m$^3$ of sludge was not yet completely sufficient to completely stop the emission of odor. The amount of sodium chlorite added was consumed within 2 days.

(b) With an amount of addition of 70 kg of sodium chlorite/100 m$^3$ of sludge there could be produced an optimum deodorization within 5-10 minutes. The stopping of the odor, i.e., the retarding of the bacterial decomposition of the sludge was maintained over the established standing time of 3 days. In this time the added amount of sodium chlorite was consumed.

(c) The deodorization of the sludge with amounts of additive of 100 and 120 kg per 100 m$^3$ was likewise very good. In contrast to test (b) with 70 kg per 100 m$^3$ of sludge after 3 days standing, however, therewas not detectable any further advantage. Possibly longer standing times than 3 days are possible at the two higher amounts of additive.

In all experiments the pH value was practically unchanged through the addition of sodium chlorite.

Example 4

There accumulated in a communal sewage treatment plant with a two stage waste water purification per day about 450 m$^3$ of sludge (primary an overflow sludge with a dry material content of about 3% E. The sludge was drawn off several times per day from the collection filter of the preliminary clarification and piled in a thickener. According to the amount of sludge accumulated there resulted staying times in the thickener of 8–36 hours.

Since the sewage treatment plant previously had no sludge elimination of its own, the sludge was concentrated in a neighboring sewage works together with the accumulating sludge there via methane decay.

During the standing of the sludge in the thickener up to 36 hours there occurred greater odor emissions in the form of hydrogen sulfide gas and other ill-smelling specific putrefying gases, especially in warm seasons. Since the sewage treatment plant is in the direct neighborhood of a leisure park, there is here frequently too great loading of the recuperative demand. Also the professional personnel of the sewage treatment plant is continuously exposed to the emission of odor.

By the addition of sodium chlorite with the amount of additive being from 70 kg and up of about 24 weight % of sodium chlorite solution per 100 m³ of sludge there can be attained a complete elimination of the ill-smelling odors as well as a retardation of the fermentation process for the time of the storage of the sludge. The sodium chlorite solution was added at the sludge lines to the thickener.

Example 5

In a sewage treatment works with a two stage waste water purification, which did not have available its own sludge disposal there was drawn off several times a day in a 250 m³ sludge holding buffer tank the daily accumulating sludge of 400–450 m³, and from the holding tank it was pumped out 2–3 times a day via an underground, about 10 km long, pressure line to the main sewage treatment works. Depending on the accumulation of sludge the time in the collection tank was up to 24 hours.

After pumping from here the sludge was deposited in the main treatment works together with the sludge of the main treatment works in a deep-lying central collection tank from which the sludge was subsequently let to the sewer towers.

There occurred from both the sludge buffer tank of the first sewage treatment works and the central collection tank of the main sewage treatment works, intolerable sewer gas emissions. Since the main sewage treatment works lies within a dense area of settlement this leads not only to a continuous health hazard for the coworkers of the sewage treatment plant but above all to the very great odor annoyance to additional neighboring areas.

To eliminate the sludge odor and to stop further fermentation process the addition of sodium chlorite has proven outstandingly good, specifically in amounts of addition according to the type of sludge of 50 or 70 kg of the about 24 weight % sodium chlorite solution per 100 m³ of sludge. Dosaging was in the sludge funnel of preliminary tank during the withdrawal of the sludge. Already a short time after the addition of the oxidation agent there was established a trouble-free elimination of odor so that there did not occur odor emissions either at the sludge buffer tank of the first sewage treatment plant or the central collection tank of the main sewage treatment plant.

Also with sodium chlorite deodorized sludge which first was led via the pressure line of the central collection tank after 24 hours standing there were no longer unpleasant odors after this time, i.e., the amount of sodium chlorite was sufficient to maintain the stoppage of the bacterial decomposition process in the sludge. The sensory observation in all operating tests were taken of several test people, among others, the expert personnel of the sewage treatment works.

In contrast to untreated sludge with the sludge deodorized with sodium chlorite there was established neither a difference in the subsequent putrefaction process (methane decay) nor was there a difference in the amounts of the putrefaction gas.

Example 6

A portion of the sludge of a communal sewage treatment plant having 1.2 million population equivalents was dewatered via a centrifuge in operating tests of several days duration with addition of an organic flocculating agent. The test served as the preliminary test for a possible future sludge operation. Since the accumulated sludge in the buffer containers had staying times of up to 24 hours the sludge brought to the centrifuge naturally showed a very strong, specific sludge odor which preferentially was liberated during the dewatering phase. Also the discharge from the centrifuge naturally had the unpleasant odors so that in wide areas of the test fields there were great ill-smelling emissions of odors.

In consideration of the later total conception of the sludge preparation namely the dewatering of the total accumulating sludge of the above mentioned sewage treatment plant via centrifuge there had to be considered odor annoyances in other areas, since the sewage treatment plant lay in a densely settled living and working area.

The ill-smelling odors occurring in the dewatering tests sludge could be completely stopped by the addition of sodium chlorite in an addition amount of about 70 kg of the about 24 weight % sodium chlorite solution per 100 m³ of sludge, as was proven to be trouble free by comparison tests, i.e., dewatering tests without addition of sodium chlorite. The sensory opinions thereby were undertaken by several test people, among others the experts of the sewage treatment plant.

The addition of the chemical to the filled sludge buffer tank took place very simply from the sodium chlorite original package with the help of a hand pump. The chemical was subsequently thoroughly mixed in within a short time with the aid of compressed air. Already a few minutes after addition of the oxidizing agent there was ascertainable a trouble free elimination of odor. There also did not occur odor emissions during the dewatering process and in the centrifuge discharge while with the untreated comparison sludge the ill-smelling odor specific for the sludge was present.

Besides the sensory tests there took place sampling of the supply, of the center and discharge of the untreated and sodium chlorite treated sludge for investigation of different parameters in the laboratory. As is shown in the following table the deodorization of the sludge with sodium chlorite had no negative effects on the dewaterability of the sludge by means of the centrifuge.

% TS=dry material content (i.e. total solids)
GV=loss on ignition
CSB=chemical oxygen demand
$BSB_5$=biochemical oxygen demand after 5 days

TABLE 1

| Test | Type of Treatment | Centrifuge Compacity | Centrifuge Running Time per Test | Sludge Used per Test | Starting amount of sludge in funnel (m³) addition of NaClO2, 24% per amount of starting sludge (kg) After 5 Days | Addition of NaClO2 24% based on 100 m³ sludge. | Remarks |
|---|---|---|---|---|---|---|---|
| 2 | without NaClO2 (start) | 50 | 30 | 25 | 115 | — | Specific type of odor according to the sludge |
| 2 | with NaClO2 | 50 | 30 | 25 | 90/70 | 77 | Fresh odor, slight clearing of the sludge |

TABLE 2

| Test | Sludge Centrifuge m³/h | TS % | GV % | Flocculating Addition 1/h | pH | Filtrate TS % | GV % | CSB mg/l | BSB5 mg/l | Discharge TS % | GV % | Remarks Addition of NaClO2 24% (kg) |
|---|---|---|---|---|---|---|---|---|---|---|---|---|
| 1 | 50 | 1.35 | — | 2800 | 6.5 | 0.14 | — | 1240 | 309 | 25.0 | 76.3 | Without NaClO2 (Start) |
| 2 | 50 | 1.32 | 73.4 | 2800 | 6.6 | 0.16 | 25.0 | 1020 | 321 | 24.4 | 70.4 | 70 |

Example 7

The waste water sludge resulting from the biological waste water purification of a paper factory for newsprint having a pH of 6.5 and dry material content of 2–3% was thickened in a sludge thickener to about 9%. The thickener was continuously operated with residence times of the waste water sludge of 10 hours. The thickened sludge was subsequently dewatered to 45% TS via travelling sieve presses and discharged via conveyor belts to an intermediate deposit with storing times of about 7 days. Once a week it was carried off to a distant deposit by truck. The accumulation of sludge per day amounted to about 110 metric tons.

The residence times in the thickener lead to the formation of large amounts of hydrogen sulfide and sludge digestion gas through anaerobics. In the vicinity of the thickener the $H_2S$ concentration in the air was measured up to 160 ppm so that the gases emitted here lead to great odor problems. Also in the dewatering process at the travelling sieve presses high amounts of hydrogen sulfide became free because of the load of the sludge so that working in the press house must be considered as dangerous to health.

As a result of the long storage times of the still wet sludges in the intermediate deposits, here also there are anaerobic decomposition processes by microorganisms and therewith the formation of hydrogen sulfide and other sludge digestion gases. In the transportation of the sludge the odors found become free and lead to large loads on further living areas. Also the odors are to a large extent carried along through the transportation journey to the place.

The addition of sodium chlorite in an amount of about 50 kg of the about 24 weight % sodium chlorite solution per 10 metric tons of dewatered sludge leads to a complete retardation of the anaerobic decomposition process in the thickener and therewith to the complete stopping of hydrogen sulfide and sludge digestion gas at the thickener. As a result thereof there no longer occur odor emissions in the press house so that this work also is held completely free from noxious gas.

The selected optimum place of addition of sodium chlorite furthermore also guarantees that the dewatered sludge is completely deodorized. Furthermore through the loading with sodium chlorite there was also attained the bacterial decomposition in the sludge of the intermediate deposit. In this way it is possible to completely stop the formation of anaerobic ill-smelling odors so that the serious odor problems in the days of the sludge removal becomes meaningless. Within the storage time of 1 week the oxidation agent also was completely used up.

50 kg of 24% sodium chlorite is 12 kg of sodium chlorite.

120 kg of 24% sodium chlorite is 28.8 kg of sodium chlorite.

70 kg of 24% sodium chlorite is 16.8 kg of sodium chlorite.

What is claimed is:

1. A process of deodorizing a waste water sludge containing fermentation causing microorganism according to claim 17 consisting essentially of treating the waste water sludge at a temperature of 5 to 40° C. and a pH of 5.0 to 7.0 with an active oxygen developing compound selected from the group consisting of alkali metal chlorites and alkaline earth metal chlorites in an amount sufficient to temporarily delay the fermentation process caused by such microorganisms.

2. The process of claim 1 wherein the active oxygen developing compound is sodium chlorite or potassium chlorite.

3. The process of claim 2 wherein the active oxygen developing compound is sodium chlorite.

4. The process of claim 3 wherein the sludge is treated at 5–25° C.

5. The process of claim 4 wherein the sludge treatment is carried out at a pH of 5.0 to 6.8.

6. The process of claim 2 wherein the sludge treatment is carried out at 5–25° C.

7. The process of claim 6 wherein the sludge treatment is carried out at a pH of 5.0 to 6.8.

8. A process according to claim 2 wherein the waste water sludge contains hydrogen sulfide and the deodorization includes the elimination of odors caused by hydrogen sulfide.

9. The process of claim 1 wherein the active oxygen developing compound is calcium chlorite.

10. The process of claim 1 wherein the amount of oxygen developing compound is equivalent to 50 to 120 kg of 24 weight % sodium chlorite solution per 100 m$^3$ sludge.

11. The process of claim 10 wherein the active oxygen developing compound is sodium chlorite.

12. The process of claim 11 wherein the amount of sodium chlorite is 12 to 28.8 kg of sodium chlorite per 100 m$^3$ of sludge.

13. The process of claim 12 wherein the amount of sodium chlorite is 12 to 16.8 kg of sodium chlorite per 100 m$^3$ of sludge.

14. A process according to claim 1 wherein there are present in the sludge anearobic fermentation causing nicroorganisms and the active oxygen developing compound is employed in an amount sufficient to stop anaerobic fermentation.

15. A process according to claim 1 wherein the waste water sludge contains hydrogen sulfide and the deodorization includes the elimination of odors caused by hydrogen sulfide.

16. A process of deodorizing a waste water sludge containing fermentation causing microorganisms comprising treating the waste water sludge at a temperature of 5 to 40° C. and a pH of 5.0 to 7.0 with an active oxygen developing compound selected from the group consisting of alkali metal chlorites and alkaline earth metal chlorites in an amount sufficient to temporarily delay the fermentation process caused by such microorganisms but not to kill all of the organisms.

17. The process of claim 16 wherein the active oxygen developing compound is sodium chlorite or potassium chlorite.

18. A process according to claim 10 consisting of treating the waste water sludge at a temperature of 5 to 40° C. and a pH of 5.0 to 7.0 with an active oxygen developing compound selected from the group consisting of alkali metal chlorites and alkaline earth metal chlorites in an amount sufficient to temporarily delay the fermentation process caused by such microorganisms.

19. A process according to claim 18 wherein the active oxygen developing compound is sodium chlorite or potassium chlorite.

20. A process according to claim 19 wherein the waste water sludge contains hydrogen sulfide and the deodorization includes the elimination of odors caused by hydrogen sulfide.

* * * * *